ical Patent [19] [11] Patent Number: 4,968,898
Hushimi et al. [45] Date of Patent: Nov. 6, 1990

[54] PULSE SHAPING CIRCUIT FOR RADIATION DETECTOR

[75] Inventors: Kazuo Hushimi; Shoichi Ohkawa, both of Tokyo, Japan

[73] Assignee: Jeol Ltd., Tokyo, Japan

[21] Appl. No.: 255,487

[22] Filed: Oct. 11, 1988

[30] Foreign Application Priority Data

Oct. 12, 1987 [JP] Japan .................................. 62-257855

[51] Int. Cl.$^5$ ............................................. H03K 5/00
[52] U.S. Cl. ..................................... 307/268; 307/271; 307/520; 307/311; 328/167; 328/2; 250/214 R
[58] Field of Search ....................... 307/268, 271, 311; 328/167, 2; 250/214 R

[56] References Cited

U.S. PATENT DOCUMENTS

| | | | |
|---|---|---|---|
| 3,968,448 | 7/1976 | Stenning | 328/167 |
| 4,450,479 | 5/1984 | Horne | 250/332 |
| 4,460,830 | 7/1984 | Allemand et al. | 250/370.07 |
| 4,461,952 | 7/1984 | Allemand et al. | 250/370 |
| 4,591,984 | 5/1986 | Mori | 250/363.02 |
| 4,682,115 | 7/1987 | Mita et al. | 328/167 |

OTHER PUBLICATIONS

I.E.E.E., Transactions in Nuclear Science, No. 1, pp. 412–428, Radeka V., Trapezoidal Filtering of Signals From Large Germanium Detectors of High Rates, 1972.
I.E.E.E., Transactions in Nuclear Science, NS-29, No. 3, pp. 1125–1141 Goulding, F., et al., Signal Processing for Semiconductor Detectors, 1982.

*Primary Examiner*—Stanley D. Miller
*Assistant Examiner*—T. Cunningham
*Attorney, Agent, or Firm*—Fitzpatrick, Cella, Harper & Scinto

[57] ABSTRACT

A pulse shaping circuit for use in a radiation detector. This circuit is adapted for x-ray spectroscopy. The pulse shaping circuit comprises a circuit for converting the output signal from the radiation detector into a step-function waveform, a pseudo-Gaussian filter consisting of a plurality of cascaded filter circuits, an adder circuit, and a gated integrator for integrating the output from the adder circuit. The adder circuit proportionally adds the outputs of each of the plurality of filter circuits in a predetermined manner and sums them up. The pulse shaping circuit achieves a high counting rate and a high resolution.

23 Claims, 7 Drawing Sheets

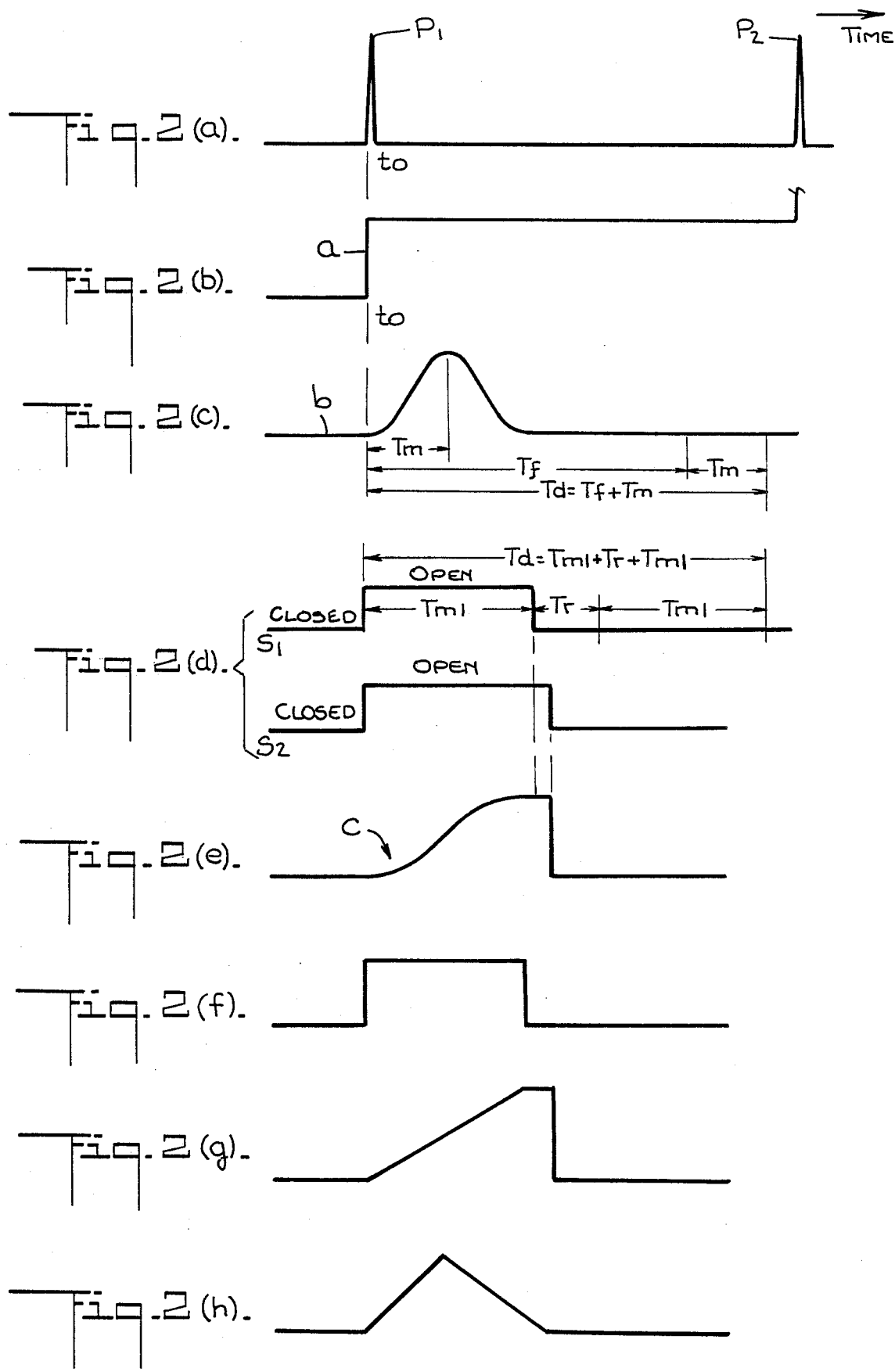

$M_0=0.15$ $M_1=0.42$ $M_2=-0.1$ $M_3=0.53$ $M_0=0.14$ $M_1=0.24$ $M_2=0$ $M_3=0.62$

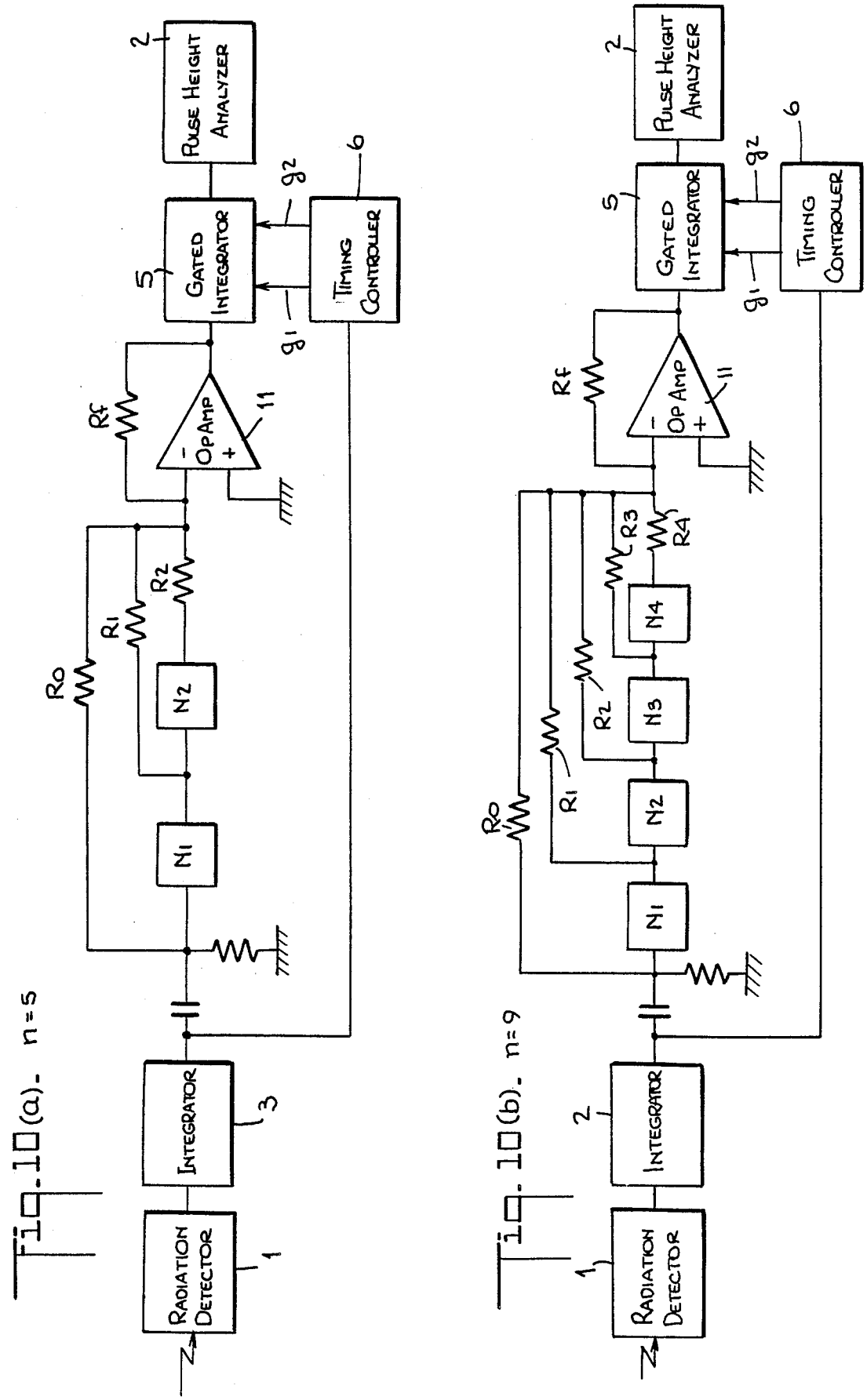
Fig. 10(a). n=5
Fig. 10(b). n=9

PULSE SHAPING CIRCUIT FOR RADIATION DETECTOR

BACKGROUND OF THE INVENTION

1. Field of the Invention

The present invention relates to a radiation detector used for x-ray spectroscopy, for example, and, more particularly, to a circuit for modifying the shape of the output pulse from a radiation detector, such as a semiconductor detector.

2. Description of the Prior Art

A conventional pulse shaping circuit is shown in FIG. 1, where the output signal from a radiation detector 1 is fed to a pulse height analyzer 2 via an integrator 3 and a shaping circuit 4. Specifically, the output signal from the detector 1 is integrated by the integrator 3 and converted into a step voltage signal a (See FIG. 2) proportional to the energy of the incident radiation. The step voltage signal a is shaped into a pulse b having an amplitude proportional to the step voltage by the shaping circuit 4. Pulse b is then fed to the pulse height analyzer 2. The output signal from the radiation detector 1 is shown in FIG. 2(a). The step voltage a delivered from the integrator 3 is shown in FIG. 2(b). When a well known pseudo-Gaussian filter is used as the shaping circuit 4, the output signal b from this Gaussian filter takes a Gaussian waveform as shown in FIG. 2(c).

As shown in FIG. 2(c), it is assumed that radiation falls on the detector 1 at an instant of time $t_o$. The signal b reaches its maximum value after a lapse of a period $T_m$. The signal returns to its initial level when a period $T_f$ elapses. The pulse height analyzer 2 makes an analysis of the pulse height when the maximum level is reached.

The next pulse $P_2$ produced by the radiation detector 1 cannot be measured before a period $T_d$ elapses, $T_d = T_f + T_m$. The period $T_d$ is called the dead time. The period $T_f$ is equal to the time taken for the pulse b to attenuate below 1/1024 of the maximum level if the pulse height is quantized by means of 1024 quantization levels. Generally, it is necessary that the dead time $T_d$ be several times as long as the period $T_m$.

V. Radeka has proposed a pulse shaping circuit which has a gated integrator (IEEE, Trans. Nucl. Sci., NS-19, No. 1, 412 (1972)). This shaping circuit is shown in FIG. 3(a), where a gated integrator 5 is inserted between a shaping circuit 4 and a pulse height analyzer 2. A timing controller 6 produces gating signals $g_1$ and $g_2$ to the integrator 5. One example of the gated integrator 5 is shown in FIG. 3(b).

Referring to FIG. 3(b), the gated integrator 5 comprises an input capacitor $C_1$, an operational amplifier and a feedback capacitor $C_2$. The gated integrator 5 also has switches $S_1$ and $S_2$ which are opened and closed in response to gating signals $g_1$ and $g_2$, as shown in FIG. 2(d), supplied from the timing controller 6. Therefore, the gated integrator 5 starts integrating its input signal at the instant $t_o$ when radiation falls on the detector 1. After a lapse of the period $T_m$ the Gaussian waveform shown in FIG. 2(c) completely returns to the initial level, and then the switch $S_1$ is closed, whereby the integration operation ends. The amplitude of the output of the integrator 5 at this time is measured by the pulse height analyzer 2, and then the switch $S_2$ is closed to discharge a capacitor $C_2$. Immediately thereafter the output from the integrator 5 goes back to the initial level and so the waveform assumes a shape as shown in FIG. 2(e). As soon as the output settles down to the initial level, the next pulse signal can be measured.

With this pulse shaping circuit shown in FIG. 3(a), signal b is integrated during the measurement and, therefore, noise introduced into signal a is greatly reduced by the averaging action of the integration. Hence, the measuring accuracy is improved.

V. Radeka has also proposed the application of a rectangular wave as shown in FIG. 2(f), instead of the Gaussian waveform shown in FIG. 2(c), to such a gated integrator incorporated in a pulse shaping circuit. The integrator produces a trapezoidal waveform as shown in FIG. 2(g). As the hypotenuse of this trapezoid approaches a straight line, the averaging action approaches an ideal, thus improving the measuring accuracy further.

It is known that a rectangular wave can be created by the use of delay lines, but the resistive component of the delay lines makes it impossible to obtain an ideal rectangular wave. Also, it is not easy to change the delay time. For these reasons, this method has not yet been put into practical use.

F. S. Goulding et al. have proposed that a triangular waveform as shown in FIG. 2(h) be applied to a gated integrator (F. S. Goulding and D. A. Landis, IEEE Trans. Nucl. Sci., NS-29 No. 3, 1125 (1982)). They also have noticed that shortening the dead time $T_d$ induces the associated amplifier to produce more delta noise, and have proposed an index given by the product of noise and the dead time, i.e., $\overline{N}_d^2 \cdot T_d$, to evaluate the characteristics of this kind of pulse shaping circuit. This has been considered highly valuable. $\overline{N}_d^2$, called a delta noise index, is given by:

$$\overline{N}_d^2 = {}^n\!\int_o^\infty [F(t)]^2 dt$$

where F (t) is the waveform of the output from a radiation detector. It is considered that as the value of the product $\overline{N}_d^{-2} \cdot T_d$ decreases, the characteristics of the pulse shaping circuit are improved.

The theoretically optimum values of the product $\overline{N}_d^{-2} \cdot T_d$ of various pulse shaping circuits are listed below in Table 1.

TABLE 1

| | Pulse Shaping Circuit | | | |
|---|---|---|---|---|
| | (1) | (2) | (3) | (4) |
| $\overline{N}_d^2 \cdot T_d$ | 9.4 | 7.35 | 6 | 5 |

In Table 1, pulse shaping circuit (1) is the conventional circuit shown in FIG. 1. Pulse shaping circuit (2) is the already proposed circuit which uses a gated integrator as shown in FIG. 3(a). Circuit (3) utilizes a triangular waveform as proposed by F. S. Goulding et al. Circuit (4) employs a rectangular waveform as proposed by V. Radeka. In the cases where a gated integrator is used, $T_d$ is given by $T_d = T_{m1} + T_r$, where $T_{m1}$ is the time period when $S_1$ is open and $T_r$ is the recovery time as shown in FIG. 2(d).

As can be seen from this table, the use of a rectangular waveform theoretically gives rise to the best value. However, this method has not been put into practical use as mentioned previously.

SUMMARY OF THE INVENTION

It is an object of the present invention to provide a practical version of the aforementioned method using a rectangular waveform as proposed by V. Radeka.

In accordance with the invention, appropriate Gaussian filters are used instead of delay lines. The filters are connected in cascade. The interstage outputs and the output from the final stage are weighted in a predetermined manner and summed up. The resulting signal is supplied to a gated integrator and integrated.

The above-mentioned and other objects will be achieved by the embodiments described in the following.

BRIEF DESCRIPTION OF THE DRAWINGS

FIGS. 2(a), 2(b), and 2(c) are waveform diagrams of the output signals from radiation detector 1, integrator 3, and shaping circuit 4, respectively, shown in FIG. 1;

FIGS. 2(d) and 2(e) are waveform diagrams showing the timing at which switches $S_1$ and $S_2$ are opened and closed;

FIGS. 2(f) and 2(g) are diagrams of a rectangular waveform applied to a gated integrator as proposed by V. Radeka and a trapezoidal waveform produced by the integrator, respectively;

FIG. 2(h) is a diagram of a triangular waveform applied to a gated integrator as porposed by F. S. Goulding et al.;

FIG. 6(a) is a circuit diagram of a pulse shaping circuit built in accordance with the invention and based on the A-type pseudo-Gaussian filter shown in FIG. 5(a);

FIG. 6(b) is a circuit diagram of another pulse shaping circuit built in accordance with the invention and based on the B-type pseudo-Gaussian filter shown in FIG. 5(b);

FIG. 10(a) is a diagram of another embodiment of the pulse shaping circuit showing the arrangement of the poles of a directly synthesized Gaussian filter with n=5; and FIG. 10(b) is a diagram of a further embodiment of the pulse shaping circuit showing the arrangement of the poles of a directly synthesized Gaussian filter with n=9.

DESCRIPTION OF THE PREFERRED EMBODIMENTS

A directly synthesized Gaussian filter is available as a kind of pseudo-Gaussian filter (Nucl. Instr. and Meth., 138, p. 85 (1976)). This filter is characterized by the waveform going back to the initial level rapidly. Filters of this kind come in various types according to various pole numbers n as listed in Table 2.

TABLE 2

|       | n = 3     | n = 5     | n = 7     | n = 9     |
|-------|-----------|-----------|-----------|-----------|
| $A_0$ | 1.2633573 | 1.4766878 | 1.6610245 | 1.8258017 |
| $A_1$ | 1.1490948 | 1.4166647 | 1.6229725 | 1.9781472 |
| $W_1$ | 0.7864188 | 0.5978596 | 0.5007975 | 0.441232  |
| $A_2$ |           | 1.2036832 | 1.4949993 | 1.7106904 |
| $W_2$ |           | 1.2994843 | 1.0454546 | 0.903118  |
| $A_3$ |           |           | 1.2344141 | 1.54632   |
| $W_3$ |           |           | 1.7113028 | 1.4177627 |
| $A_4$ |           |           |           | 1.2543055 |
| $W_4$ |           |           |           | 2.0665466 |

Figure 4:
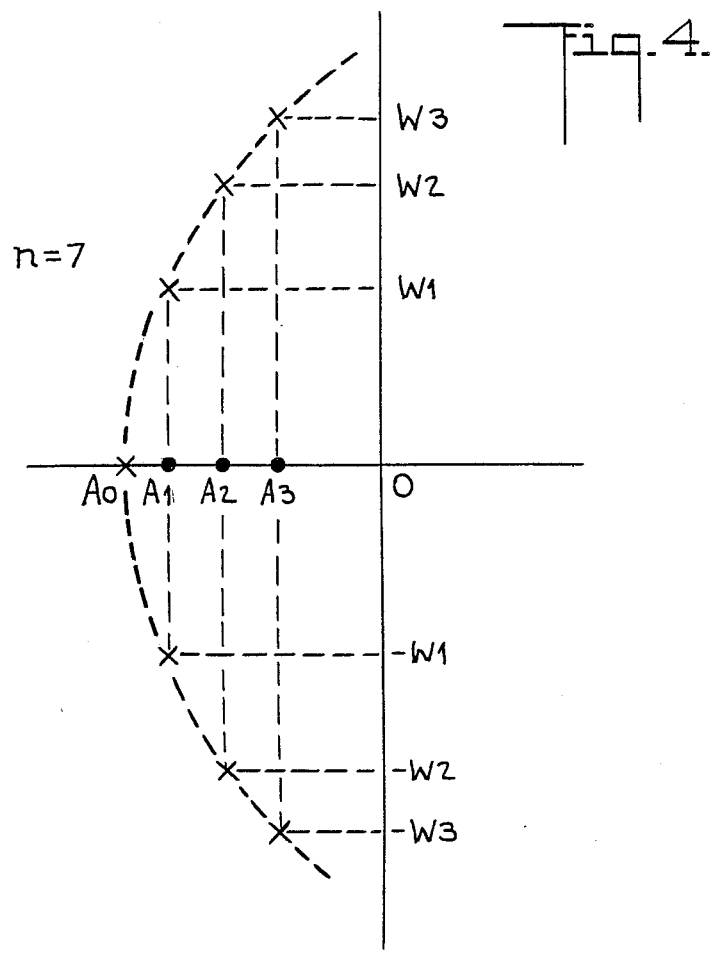
FIG. 4 is a diagram showing the arrangement of the poles of a directly sythesized Gaussian filter with n=7.
Figure 5A:
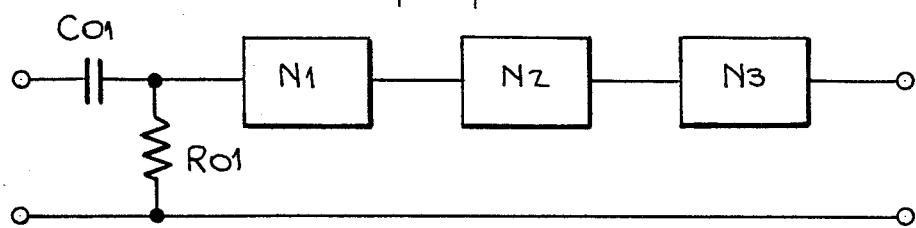
FIG. 5(a) is a circuit diagram of a directly synthesized Gaussian filter of the A type.
Figure 5B:
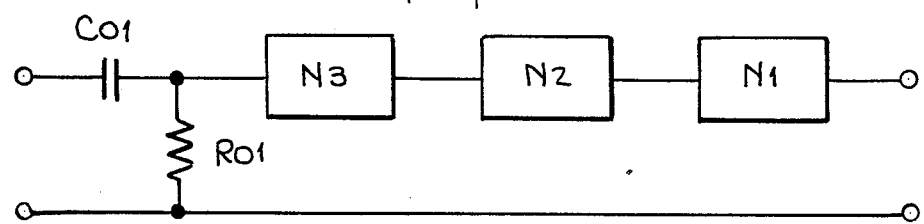
FIG. 5(b) is a circuit diagram of a directly synthesized Gaussian filter of the B type.
Figure 8A:
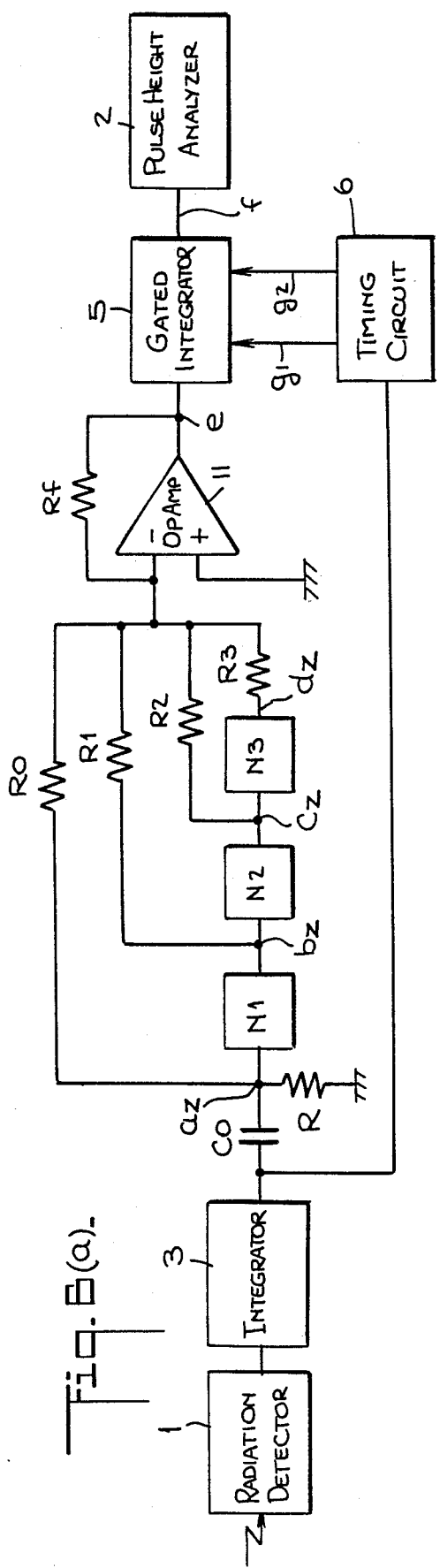
FIG. 8 is a graph showing the output e from operational amplifier 11 and the output f from the gated integrator 5 included in the circuit shown in FIG. 6(b), and in which $M_o=0.14$, $M_1=0.24$, $M_2=0.0$, and $M_3=0.62$.
Figure 8B:
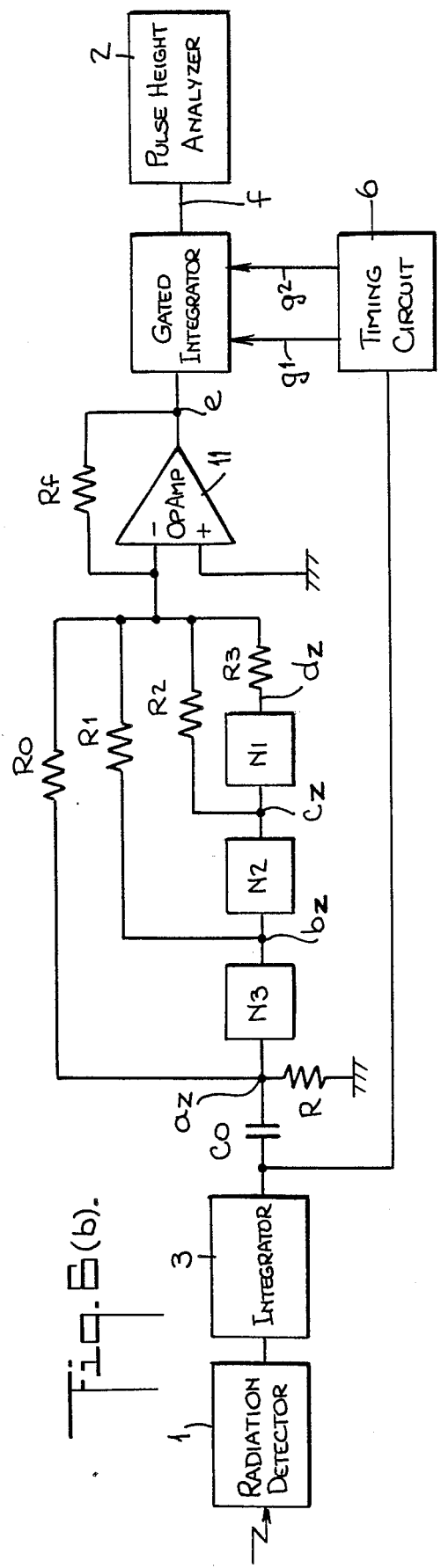

FIG. 4 shows the arrangement of poles of a filter with n=7. In FIG. 4, $A_o$ shows a pole of a real number. $A_1$, $A_2$, $A_3$ $\pm W_1$, $\pm W_2$, and $\pm W_3$ show the real parts ($A_1$-$A_3$) and the imaginary parts ($\pm W_1$-$W_3$) of the remaining six poles. The functions of the circuit are given by $A_o$, ($A_1 \pm W_1$), ($A_2 \pm W_2$) ($A_3 \pm W_3$). A pseudo-Gaussian filter with n=7 is obtained by connecting active filters $N_1$, $N_2$, $N_3$ in cascade after a differentiating circuit $N_o$ which provides real root $A_o$. The active filters $N_1$, $N_2$, $N_3$ provide complex roots $A_1 \pm W_1$, $A_2 \pm W_2$, $A_3 \pm W_3$, respectively. FIG. 5(a) shows a Gaussian filter of the A type in which the active filters $N_1$, $N_2$, $N_3$ are connected in cascade in order of decreasing quality factors ("Q factors"), or W/A. FIG. 5(b) shows a Gaussian filter of the B type in which the filters $N_1$, $N_2$, $N_3$ are connected in cascade in order of quality factors.

When a waveform as shown in FIG. 2(b) is applied to these psuedo-Gaussian filters, they usually produce Gaussian waveforms as shown in FIG. 2(c). The present invention is based on this type of pseudo-Gaussian filter. The outputs from the cascaded filters $N_o$-$N_3$ are weighted and summed up to obtain an output approximating a rectangular wave.

FIG. 6(a) shows a pulse shaping circuit based on the A-type psuedo-Gaussian filter shown in FIG. 5(a). FIG. 6(b) shows a pulse shaping circuit based on the B-type directly synthesized Gaussian filter shown in FIG. 5(b). The rates $M_o$, $M_1$, $M_2$, $M_3$, at which the outputs from the filters are respectively added up, are the ratios of input resistance $R_o$, $R_1$, $R_2$, $R_3$ to a feedback resistance $R_f$ connected to the operational amplifier 11, that is, $M_o=R_f/R_o$, $M_1=R_f/R_1$, $M_2=R_f/R_2$, $M_3=R_f/R_3$. The weights can be varied by changing the values of the input resistances $R_o$, $R_1$, $R_2$, $R_3$. The output e from the operational amplifier 11 is give by:

$$e = M_o \cdot a_Z + M_1 \cdot b_Z + M_2 \cdot c_Z + M_3 \cdot d_Z$$

where $a_Z$, $b_Z$ $c_Z$ $d_Z$ are interstage outputs.

In FIGS. 6(a) and 6(b) $C_o$ is an input capacitor and R is a bias resistor.

Figure 7A:
FIG. 7(a) is a waveform diagram of the output from each of the integrator circuits 3 shown in FIGS. 6(a) and 6(b)
Figure 7B:
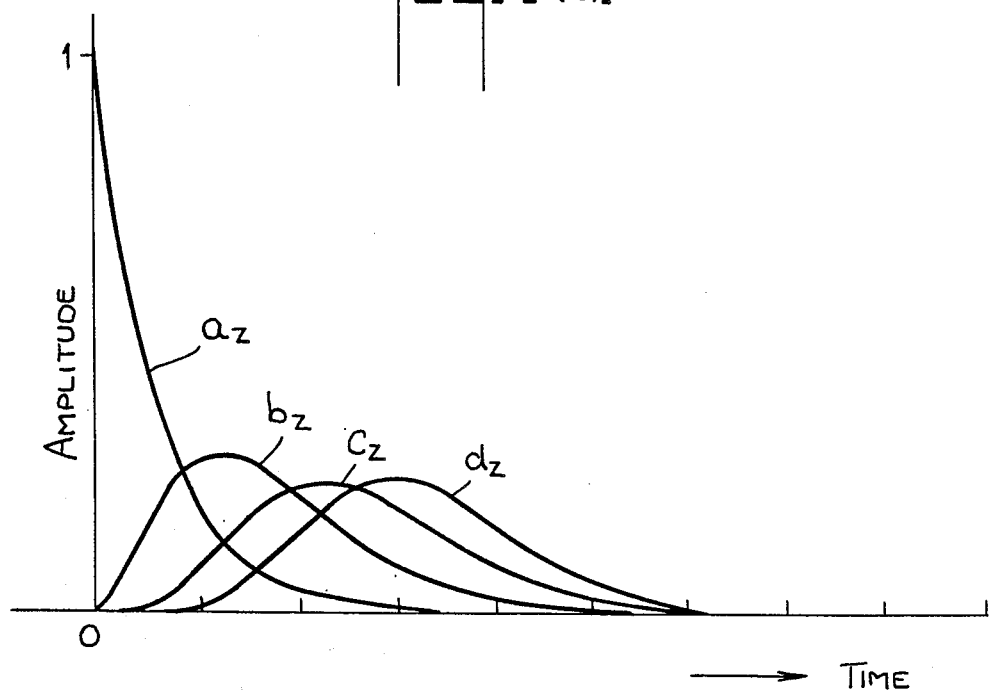
FIG. 7(b) is a waveform diagram of interstage signals $a_Z$, $b_Z$, $c_Z$, and $d_Z$ from the circuits shown in FIGS. 6(a) and 6(b)

If the output from the integrator circuit 3 of the configuration shown in FIG. 6(b) is a step function as shown in FIG. 7(a), the interstage outputs $a_Z$, $b_Z$, $c_Z$, $d_Z$ respond as shown in FIG. 7(b). Since the tails of the waveforms of the outputs $a_Z$, $b_Z$, $c_Z$ cancel out, the output $d_Z$ rapidly settles down to the base line.

Figure 8:
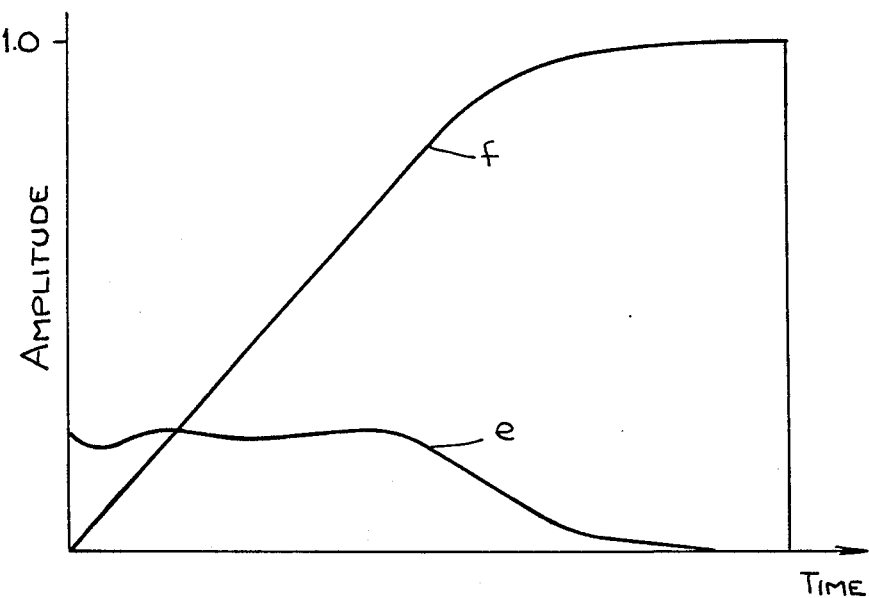

These interstage outputs were added up under the conditions $M_o=0.14$, $M_1=0.24$, $M_2=0.0$, $M_3=0.62$. The output e from the operational amplifier 11 was integrated by the gated integrator 5. The output e from the amplifier 11 and the output f from the integrator 5 are shown in FIG. 8. This output e is not a perfect rectangular wave, unlike the wave shown in FIG. 2(f). The output f (FIG. 8) obtained by integrating the output e approximates the trapezoidal wave shown in FIG. 2(g). Especially, the rising portion can be regarded as substantially straight.

Figure 9:
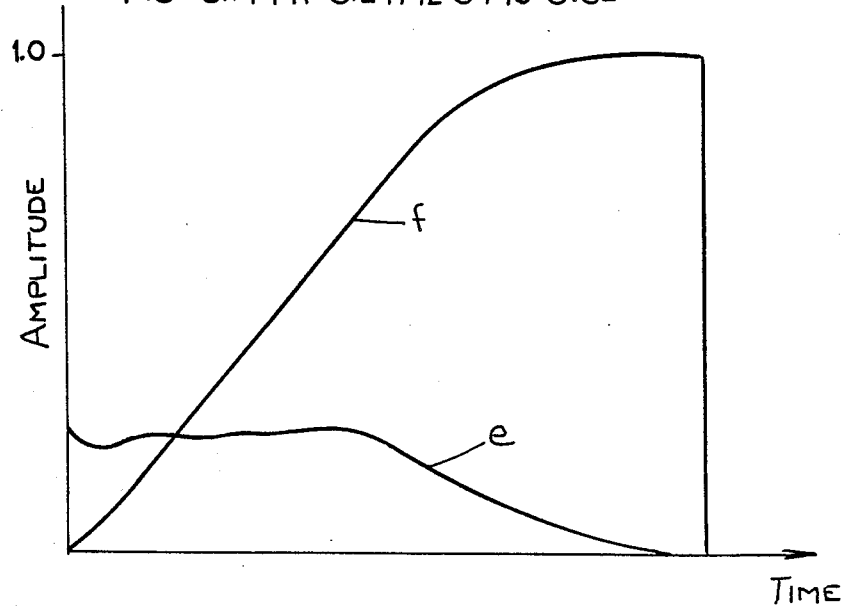
FIG. 9 is a graph showing the output e from operational amplifier 11 and the output f from the gated integrator 5 included in the circuit shown in FIG. 6(a), and in which $M_o=0.15$, $M_1=0.42$, $M_2=-0.1$, and $M_3=0.53$.

FIG. 9 shows the output e from the operational amplifier 11 and the output f from the gated integrator 5 included in the A-type circuit shown in FIG. 6(a), obtained under the conditions $M_o=0.15$, $M_1=0.42$, $M_2=-0.1$, and $M_3=0.53$.

With the circuit shown in FIG. 6(a) and graphed in FIG. 9 the output f from the gated integrator 5 approaches the trapezoidal wave shown in FIG. 2(g). The rising portion can be regarded as substantially straight.

Table 3 shows the values of $\overline{N}_d^2 \cdot T_d$ of the circuits shown in FIGS. 6(a) and 6(b) calculated under the condition $T_r=0$.

TABLE 3

|  | $\overline{N}_d^2 \cdot T_d$ |
| --- | --- |
| A type | 6.1360 |
| B type | 5.8817 |

Comparison between Tables 3 and 1 shows that the novel pulse shaping circuits of the A type and the B type are much superior in performance to the known pulse shaping circuits 1 and 2 with $\overline{N}_d^2 \cdot T_d = 9.4$ and 7.35 respectively. Also, the novel circuit of the A type has a value better than the best value theoretically obtained by the method using a triangular wave.

It is necessary to select the optimum combination of the weight coefficients $M_o$, $M_1$, $M_2$, $M_3$ so that the rising portion of the trapezoidal wave may be approximated by a straight line.

Figure 1:
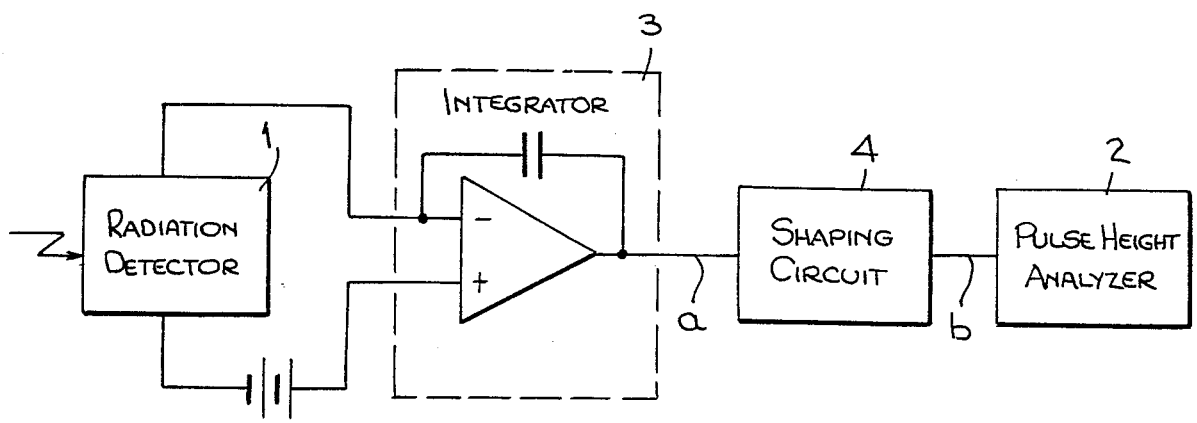
FIG. 1 is a block diagram of a conventional pulse shaping circuit.
Figure 3A:
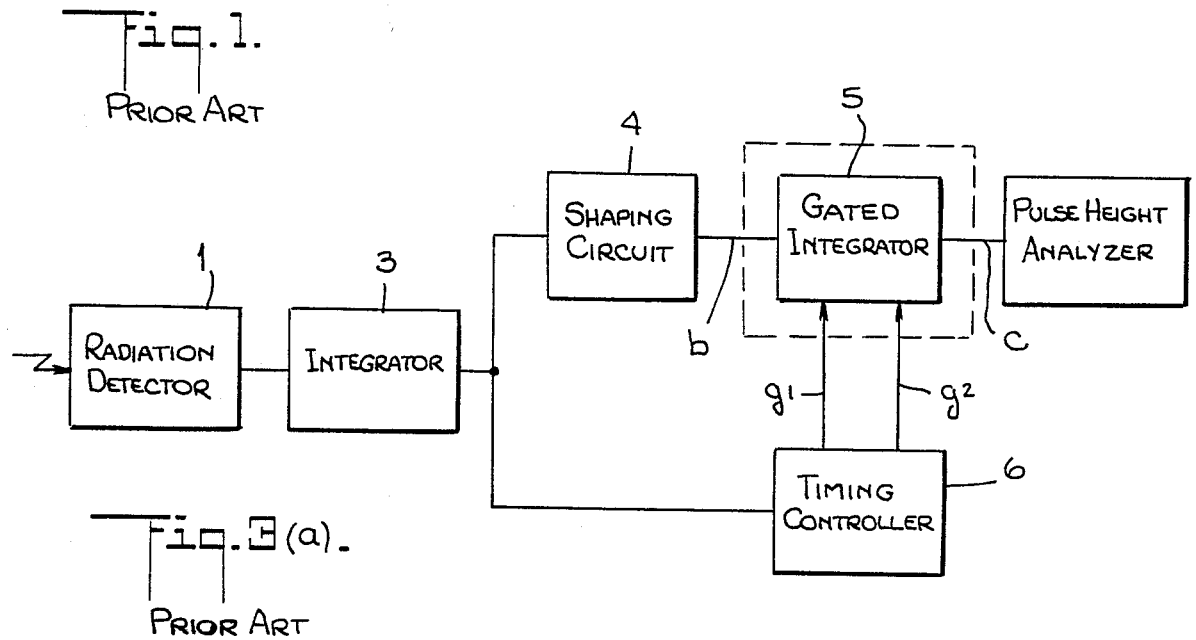
FIG. 3(a) is a block diagram of a pulse shaping circuit using a gated integrator as proposed by V. Radeka.
Figure 3B:
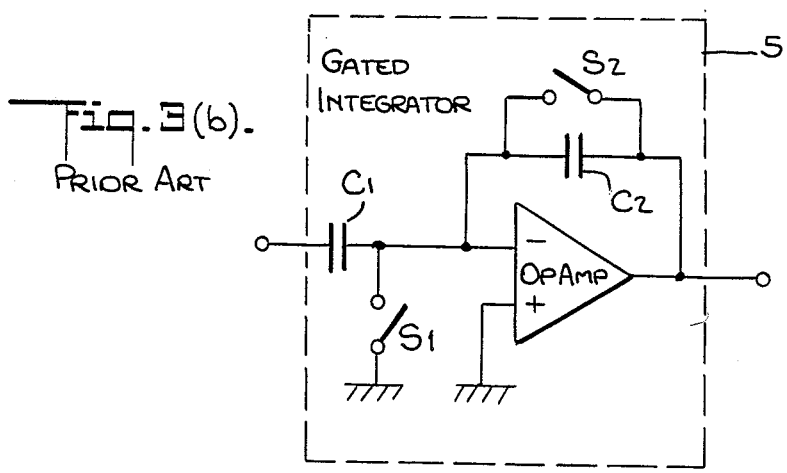
FIG. 3(b) is a circuit diagram of one example of a gated integrator.

The switch $S_1$ of the gated integrator shown in FIG. 3(b) is opened when the detector 1 supplies a signal to it as described above. Therefore, the integrator acts as a gate which initiates an integration. The switch cooperates with a capacitor $C_1$ to remove DC drift produced by the preceding stage of circuit. As a result, the initial level is stabilized. In reality, switches $S_1$ and $S_2$ can be fabricated in the form of an electronic circuit.

Directly synthesized Gaussian filters which can be put into practical use and have odd poles can have five (n=5) and nine (n=9) poles, as well as seven poles (n=7) as in the embodiment described above. As the number of the poles increases, the output approaches a Gaussian waveform more closely, but the circuit becomes accordingly more complex.

FIGS. 10(a) and 10(b) show other pulse shaping circuits according to the invention, the circuits being based on Gaussian filters with n=5 and n=9 respectively. Both shaping circuits are of the A type.

Where n=5, the optimum combination of the weight coefficients is given by $M_o=0.24$, $M_1=0.01$, and $M_2=0.75$. In this state, the value of $\overline{N}_d^2 \cdot T_d$ is 6.1660.

Where n=9, the optimum combination of the weight coefficients consists of $M_o=0.12$, $M_1=0.14$, $M_2=0.16$, $M_3=0$, and $M_4=0.58$. In this case, the value of $\overline{N}_d^2 \cdot T_d$ is 5.8623.

The terms "radiation detector", "pulse shaping circuit", "adder", "integrator", "pseudo-Gaussian filter", "directly synthesized Gaussian filter", "pulse height analyzer", "gated integrator", "differentiator", "filter circuit", "timing controller", "operational amplifier", "switch", "output converter", "filter", "active filter" and other terms identifying features of the disclosed invention are each used generically; that is, the functional requirements that must be met by each of the elements identified by these terms will be apparent to one of ordinary skill in the art, and those terms accordingly are used throughout the specification and the claims to designate any element known to those skilled in the art which meets such requirements.

The present invention is characterized by weighting and summing up the outputs from the cascaded filters and is not limited to the details of the foregoing embodiments but includes various modifications within the scope and spirit of the appended claims. More specifically, the order in cascading the filters is not restricted to the order described in A type and B type embodiments. The cascaded filter can be placed in any order so long as the appropriate weight coefficients are selected. For example, in the case of the pulse shaping circuits with n=7, not only can the filters be ordered, either N1, N2, N3 (A type) or N3, N2, N1 (B type) but the filter can be also ordered N1, N3, N2 or N3, N1, N2, provided the appropriate weight coefficients are selected.

What is claimed is:

1. A pulse shaping circuit for shaping an output signal from a radiation detector, said pulse shaping circuit comprising:
   an output converter arranged and constructed to convert the output signal from the radiation detector into a step-function signal;
   a pseudo-Gaussian filter arranged and constructed to produce a Gaussian signal responsive to the step-function signal from said output converter, wherein said pseudo-Gaussian filter comprises a plurality of cascaded filter circuits, each of said plurality of cascaded filter circuits producing a respective output and each defined by a respective quality factor; and
   an adder arranged and constructed to add together proportionally the respective outputs of said plurality of cascaded filter circuits, and to produce an output of said adder.

2. A pulse shaping circuit according to claim 1 further comprising a gated integrator arranged and constructed to integrate the output of said adder.

3. A pulse shaping circuit according to claim 1, wherein said pseudo-Gaussian filter further comprises a differentiator arranged and constructed to differentiate the step-function signal from said output converter, and said plurality of cascaded filter circuits are sequentially arranged in decreasing order of said quality factors.

4. A pulse shaping circuit according to claim 1, wherein said pseudo-Gaussian filter further comprises a differentiator arranged and constructed to differentiate the step-function signal from said output converter, and said plurality of cascaded filter circuits are sequentially arranged in increasing order of said quality factors.

5. A pulse shaping circuit for shaping an output signal from a radiation detector, said pulse shaping circuit comprising:
converting means for converting the output signal from the radiation detector into a step-function signal;
pseudo-Gaussian filter means for producing a Gaussian signal responsive to the step-function signal from said converting means, wherein said pseudo-Gaussian filter means comprises a plurality of cascaded filter circuits, each of said plurality of cascaded filter circuits producing a respective output and each defined by a respective quality factor; and
adding means for proportionally adding together the outputs of said plurality of cascaded filter circuits, and to produce an output of said adding means.

6. A pulse shaping circuit according to claim 5 further comprising a gated integrating means operably associated with said adding means for integrating the output of said adding means.

7. A pulse shaping circuit according to claim 5 wherein said filter means further comprises a differentiating means for differentiating the step-function signal, and said plurality of filter circuits are sequentially arranged in decreasing order of said quality factors.

8. A pulse shaping circuit according to claim 5 wherein said filter means further comprises a differentiating means for differentiating the step-function signal, and said plurality of filter circuits are sequentially arranged in increasing order of said quality factors.

9. A pulse shaping circuit for shaping an output signal from a radiation detector, said pulse shaping circuit comprising:
converting means for converting the output signal from the radiation detector into a step-function signal;
differentiating means for differentiating said step-function signal from said converting means;
pseudo-Gaussian filter means for producing a Gaussian signal responsive to said differentiating means, wherein said pseudo-Gaussian filter means comprises a plurality of cascaded filter circuits, each of said plurality of cascaded filter circuits producing a respective output and each defined by a respective quality factor;
adding means for proportionally adding together the outputs of said plurality of cascaded filter circuits to produce an output of said adding means; and
gated integrating means for integrating the output of said adding means.

10. A pulse shaping circuit according to claim 9 wherein said plurality of filter circuits are sequentially arranged in decreasing order of said quality factors.

11. A pulse shaping circuit according to claim 9 wherein said plurality of filter circuits are sequentially arranged in increasing order of said quality factors.

12. A method for shaping an output signal from a radiation detector, said method comprising the steps of:
converting the output signal from the radiation detector into a step-function signal;
producing a Gaussian signal responsive to the step-function signal utilizing a psuedo-Gaussian filter, wherein the filter comprises a plurality of cascaded filter circuits, each of the filter circuits producing a respective output and each being defined by a respective quality factor; and
proportionally adding together the outputs of the filter circuits, to produce an output.

13. A method according to claim 12 further comprising the step of integrating the output of said adding step.

14. A method according to claim 12 wherein said producing step further comprises the step of differentiating the step-function signal, and said plurality of filter circuits are sequentially arranged in decreasing order of said quality factors.

15. A method according to claim 12 wherein said producing step further comprises the step of differentiating the step-function signal, and said plurality of filter circuits are sequentially arranged in increasing order of said quality factors.

16. A pulse shaping circuit for shaping an output signal from a radiation detector, said pulse shaping circuit comprising:
an integrator for integrating an output signal of the radiation detector into a step-function signal;
differentiator for differentiating the step-function signal from said integrator;
a pseudo-Gaussian filter comprising a plurality of cascaded filters, each of the plurality of cascaded filters being defined by a respective quality factor, wherein said plurality of cascaded filters are sequentially arranged in increasing order of said quality factors, and wherein each of said plurality of cascaded filter circuits produce a respective output;
an adder for adding together proportionally the respective outputs of said plurality of cascaded filter circuits;
a timing controller for producing plural gating signals; and
a gated integrator responsive to the gating signals of said timing controller for integrating an output of said adder.

17. An apparatus according to claim 16, wherein said plurality of cascaded filters comprise three filters.

18. An apparatus according to claim 16, wherein said plurality of cascaded filters comprise five filters.

19. An apparatus according to claim 16, wherein said plurality of cascaded filters comprise an odd number of filters.

20. A pulse shaping circuit for shaping an output signal from a radiation detector, said pulse shaping circuit comprising:
an integrator for integrating an output signal of the radiation detector into a step-function signal;
differentiator for differentiating the step-function signal from said integrator;
a pseudo-Gaussian filter comprising a plurality of cascaded filters, each of the plurality of cascaded filters being defined by a respective quality factor, wherein said plurality of cascaded filters are sequentially arranged in decreasing order of said quality factors, and wherein each of said plurality of cascaded filter circuits produce a respective output;
an adder for adding together proportionally the respective outputs of said plurality of cascaded filter circuits;
a timing controller for producing plural gating signals; and
a second integrator responsive to the gating signals of said timing controller for integrating an output of said adder.

21. An apparatus according to claim 20, wherein said plurality of cascaded filters comprise three filters.

22. An apparatus according to claim 20, wherein said plurality of cascaded filters comprise five filters.

23. An apparatus according to claim 20, wherein said plurality of cascaded filters comprise an odd number of filters.

* * * * *